United States Patent [19]
Uzawa

[11] Patent Number: 5,270,863
[45] Date of Patent: Dec. 14, 1993

[54] ZOOM LENS SYSTEM
[75] Inventor: Tsutomu Uzawa, Tokyo, Japan
[73] Assignee: Olympus Optical Co., Ltd., Tokyo, Japan
[21] Appl. No.: 900,746
[22] Filed: Jun. 19, 1992

Related U.S. Application Data
[63] Continuation-in-part of Ser. No. 680,701, Apr. 4, 1991, abandoned.

[30] Foreign Application Priority Data

Apr. 5, 1990 [JP] Japan ................... 2-89172

[51] Int. Cl.$^5$ ............................. G02B 15/14
[52] U.S. Cl. ................... 359/682; 359/676; 359/680; 359/683
[58] Field of Search ........... 350/423, 427; 359/676, 359/680, 682, 683

[56] References Cited

U.S. PATENT DOCUMENTS

| | | | |
|---|---|---|---|
| 3,942,874 | 3/1976 | Besenmatter et al. | 350/423 |
| 4,906,078 | 3/1990 | Inabata et al. | 350/423 |
| 4,912,500 | 3/1990 | Yokota et al. | |
| 4,976,522 | 12/1990 | Igarashi | 350/423 |
| 4,991,943 | 2/1991 | Betensky | 350/427 |

FOREIGN PATENT DOCUMENTS

56-123512  9/1981  Japan.
63-292106 11/1988  Japan.

Primary Examiner—Bruce Y. Arnold
Assistant Examiner—Hung Xuan Dang
Attorney, Agent, or Firm—Cushman, Darby & Cushman

[57] ABSTRACT

A compact and light-weight zoom lens system including, in the order from the object side, a first lens unit having a negative refractive power, a second lens unit comprising a negative lens element and having a positive refractive power, and a third lens unit having a positive refractive power. The zoom lens system is adapted so as to perform variation of focal length by moving the second lens unit and the third lens unit along the optical axis while varying the airspace reserved between these lens units with the first lens unit kept stationary.

13 Claims, 13 Drawing Sheets

ZOOM LENS SYSTEM

This is a continuation-in-part of application No. 07/680,701, filed on Apr. 4, 1991, which was abandoned.

BACKGROUND OF THE INVENTION a) Field of the invention:

The present invention relates to a zoom lens system, and more specifically to a zoom lens system which is to be used with cameras incorporating electronic image pickup devices.

b) Description of the prior art:

Under the recent circumstances where compact and light weight cameras are manufactured at low costs for domestic use, it is desired to develop compact and light weight photographic lens systems which can be manufactured at low costs.

As a compact zoom lens system having a simple composition, there is known the lens system disclosed by Japanese Patent Kokai Publication No. Sho 56-123512.

The conventional zoom lens system of this type comprises, in the order from the object side, a first lens unit having a negative refractive power as a whole and a second lens unit having a positive refractive power as a whole, and is adapted so as to perform zooming by moving the first lens unit and the second lens unit along the optical axis while changing the total length of the lens system. Since a remarkable change of the total length produces undesirable effects to complicate the lens barrel to be adopted for the lens system and impose restrictions on designs of cameras to be used with the lens system, magnification of the second lens unit of the above-mentioned zoom lens system is determined so as to minimize the change of the total length of the zoom lens system.

As a zoom lens system which has a total length unchanged for zooming and a simple composition, there is known the zoom lens system proposed by Japanese Patent Kokai Publication No. Sho 63-292106. The zoom lens system of this type comprises a first lens unit which is kept stationary for zooming and has a negative refractive power as a whole, a second lens unit having a positive refractive power as a whole and a third lens unit having a positive refractive power as a whole, and is adapted so as to perform zooming by moving the second lens unit and the third lens unit along the optical axis.

The zoom lens system preferred as an embodiment of the zoom lens system proposed by Japanese Patent Kokai Publication No. Sho 63-292106 has a long total length L. Speaking more concretely, when the focal length of this zoom lens system at the wide position and the tele position thereof are represented by $f_W$ and $f_T$ respectively, the zoom lens system has $$L\sqrt{f_W \cdot f_T}$$

on the order of 6.7 to 10. In order to design this zoom lens system more compact, it is therefore necessary to shorten the total length of the lens system. When the refractive power of each lens element of the zoom lens system is strengthened for shortening the total length thereof, however, aberrations will be aggravated undesirably.

SUMMARY OF THE INVENTION

A primary object of the present invention is to provide a compact zoom lens system which has a total length unchanged by zooming, a simple composition, a field angle on the order of 46° at the wide position and a vari-focal ratio on the order of 1.6 to 2.

The zoom lens system according to the present invention comprises, in the order from the object side, a first lens unit having a negative refractive power, a second lens unit comprising a negative lens element and having a positive refractive power as a whole, and a third lens unit having a positive refractive power, and is adapted so as to perform variation of focal length by moving said second lens unit and said third lens unit along the optical axis while changing the airspace reserved between these lens units. Further, the second lens unit used in the zoom lens system according to the present invention is designed so as to satisfy the following condition (1):

$$0.5 < f_{II}/\sqrt{f_W \cdot f_T} < 2.3 \tag{1}$$

wherein the reference symbols $f_W$ and $f_T$ represent the focal lengths of the zoom lens system as a whole at the wide position and the tele position respectively, and the reference symbol $f_{II}$ designates the focal length of the second lens unit.

In order to shorten the total length of a zoom lens system, it is generally important to strengthen the refractive power especially of the second lens unit comprised therein. However, for the above-mentioned conventional example (Japanese Patent Kokai Publication No. Sho 63-292106) which uses the second lens unit composed only of positive lens elements, for example, strengthening of the refractive power of the second lens unit is undesirable since it produces remarkable aberrations.

By designing the second lens unit so as to comprise the negative lens element as described above, the zoom lens system according to the present invention is adapted so as to be capable of suppressing the production of aberrations even when the total length of the lens system is shortened by strengthening the refractive power of the second lens unit. That is to say, the object side surface of this negative lens element serves to correct especially spherical aberration, whereas the image side surface of this lens element functions to correct especially coma, astigmatism and distortion. Further, the negative lens element is capable of suppressing the chromatic aberration produced in the second lens unit and reducing the variations of chromatic aberration that are caused by varying focal length of the zoom lens system.

The condition (1) defines the refractive power of the second lens unit. If the lower limit of the condition (1) is exceeded, an advantage for shortening the total length of the zoom lens system will be obtained, but aberrations will be aggravated. If the upper limit of the condition (1) is exceeded, in contrast, the total length of the zoom lens system will undesirably be prolonged.

The object of the present invention can be accomplished by selecting the above-described composition for the zoom lens system. In order to make the zoom lens system according to the present invention more compact, it is desirable to design the lens element arranged at the most object side location in the first lens unit as a negative lens element so as to lower incident principal ray and permit shortening the diameter of the front lens unit.

In the zoom lens system according to the present invention, an aperture stop is moved together with the second lens unit or kept stationary together with the first lens unit for variation of the lens system.

It is more desirable for the zoom lens system according to the present invention to design the first lens unit and the third lens unit so as to satisfy the following conditions (2) and (3) respectively:

$$0.6 < |f_I|/\sqrt{f_W \cdot f_T} < 1.5 \quad (2)$$

$$0.5 < f_{III}/\sqrt{f_W \cdot f_T} < 5 \quad (3)$$

wherein the reference symbol $f_I$ represents the focal length of the first lens unit and the reference symbol $f_{III}$ designates the focal length of the third lens unit.

The condition (2) and the condition (3) define the refractive powers of the first lens unit and the third lens unit respectively. If the lower limit of the condition (2) or the condition (3) is exceeded, aberrations will be aggravated, thereby degrading image quality especially at the marginal portion of the image surface. If the upper limit of the condition (2) or (3) is exceeded, in contrast, the zoom lens system will have an undesirably prolonged total length.

Furthermore, it is desirable for the zoom lens system according to the present invention to design the airspace reserved between the second lens unit and the third lens unit so as to satisfy the following condition (4):

$$0.01 < |D_W - D_S|/\sqrt{f_W \cdot f_S} < 0.8 \quad (4)$$

wherein the reference symbol $f_S$ represents the geometrical mean $$(= \sqrt{f_W \cdot f_T})$$

of the focal lengths $f_W$ and $f_T$ at the wide position and the tele position respectively of the zoom lens system as a whole, the reference symbol $D_W$ designates the airspace reserved between the second lens unit and the third lens unit at the focal length $f_W$, and the reference symbol $D_S$ denotes the airspace reserved between the second lens unit and the third lens unit at the focal length $f_S$.

The condition (4) relates to relative moving distance between the second lens unit and the third lens unit. If the lower limit of the condition (4) is exceeded, the third lens unit will have a strengthened refractive power, thereby aggravating astigmatism. If the upper limit of the condition (4) is exceeded, in contrast, the zoom lens system will undesirably have a prolonged total length.

For the zoom lens system according to the present invention, it is desirable to design the above-mentioned negative lens element arranged in the second lens unit so as to satisfy the following condition (5):

$$0.2 < |f_{IIn}|/f_{II} < 0.8 \quad (5)$$

wherein the reference symbol $f_{II}$ represents the focal length of the second lens unit and the reference symbol $f_{IIn}$ designates the focal length of the negative lens element arranged in the second lens unit.

The condition (5) defines the refractive power of the negative lens element arranged in the second lens unit.

Moreover, it is desirable that at least one negative lens element used in the second lens unit is designed so as to satisfy the following condition (6):

$$-2 < (r_b + r_a)/(r_b - r_a) < 2 \quad (6)$$

wherein the reference symbols $r_a$ and $r_b$ represent the radii of curvature on the object side surface and the image side surface respectively of at least one negative lens element used in the second lens unit.

The condition (6) defines the shape of the above-mentioned negative lens element. If the lower limit of the condition (6) is exceeded, spherical aberration will be undercorrected. If the upper limit of the condition (6) is exceeded, distortion will be under-corrected.

When the negative refractive power required for the second lens unit is imparted to a single lens element, it is more desirable to design this negative lens element so as to have a shape satisfying the following condition:

$$-1.5 < (r_b + r_a)/(r_b - r_a) < 0.5 \quad (7)$$

The zoom lens system according to the present invention can be focused in any one of four modes: (1) by moving the first lens unit only, (2) by moving the second lens unit only, (3) by moving the third lens unit only and (4) by moving all the lens units.

When the zoom lens system according to the present invention is focused by moving the second lens unit or the third lens unit, only the two lens units, i.e., the second lens unit and the third lens unit, are moved for zooming and focusing.

In addition, the zoom lens system according to the present invention may be used as a vari-focal lens system which has two focal lengths selectable only for the wide position and the tele position respectively. Structure of the lens barrel can be simplified in this case.

The aperture stop may be always kept fully open so far as amount of light is adjusted properly by controlling shutter speed and selecting ND filters. In the embodiments of the present invention to be described later, locations of the aperture stops which are moved and kept fixed are collectively indicated as "pupil locations".

It is possible to compose the zoom lens system according to the present invention of four lens units by arranging, after the third lens unit, an additional lens unit which is kept fixed for zooming.

DETAILED DESCRIPTION OF THE PREFERRED EMBODIMENTS

Now, the zoom lens system according to the present invention will be described in more detail below with reference to the preferred embodiments illustrated in the accompanying drawings and given in the form of the following numerical data:

Embodiment 1

$f = 10 \sim 16$ mm, $F/4.5 \sim F/5.5$
$2\omega = 46° \sim 29°$ $r_1 = -21.6988$
$\quad d_1 = 1.0000 \quad n_1 = 1.72916 \quad \nu_1 = 54.68$
$r_2 = 24.6193$
$\quad d_2 = D_1$ (variable)
$r_3 = \infty$ (pupil)
$\quad d_3 = 0.2000$
$r_4 = 18.9362$
$\quad d_4 = 1.6000 \quad n_2 = 1.79952 \quad \nu_2 = 42.24$
$r_5 = -15.4573$
$\quad d_5 = 0.2000$
$r_6 = 6.2535$
$\quad d_6 = 2.0241 \quad n_3 = 1.57309 \quad \nu_3 = 42.57$
$r_7 = -13.5326$
$\quad d_7 = 3.6175 \quad n_4 = 1.80518 \quad \nu_4 = 25.43$
$r_8 = 4.4917$
$\quad d_8 = D_2$ (variable)
$r_9 = 16.4934$
$\quad d_9 = 2.8000 \quad n_5 = 1.48749 \quad \nu_5 = 70.20$
$r_{10} = -8.7881$
$\quad d_{10} = D_3$ (variable)
$r_{11} = \infty$
$\quad d_{11} = 0.6000 \quad n_6 = 1.51633 \quad \nu_6 = 64.15$
$r_{12} = \infty$

| f | W | S | T |
|---|---|---|---|
| $D_1$ | 7.825 | 5.119 | 2.043 |
| $D_2$ | 2.893 | 4.508 | 5.136 |
| $D_3$ | 4.166 | 5.256 | 7.734 |

$L/\sqrt{f_W \cdot f_T} = 2.2,$   $f_{II}/\sqrt{f_W \cdot f_T} = 0.81$ $|f_I|/\sqrt{f_W \cdot f_T} = 1.2,$   $f_{III}/\sqrt{f_W \cdot f_T} = 0.97$ $|D_W - D_S|/\sqrt{f_W \cdot f_S} = 0.14,$   $|f_{IIn}|/f_{II} = 0.38$ $(r_b + r_a)/(r_b - r_a) = -0.50$

Embodiment 2

$f = 10 \sim 20$ mm, $F/5 \sim F/7.1$
$2\omega = 46° \sim 24°$ $r_1 = 154.4524$
$\quad d_1 = 1.0000 \quad n_1 = 1.77250 \quad \nu_1 = 49.66$
$r_2 = 6.9847$
$\quad d_2 = 3.1376$
$r_3 = 9.6056$
$\quad d_3 = 1.9000 \quad n_2 = 1.80518 \quad \nu_2 = 25.43$
$r_4 = 13.8184$
$\quad d_4 = D_1$ (variable)
$r_5 = \infty$ (pupil)
$\quad d_5 = 0.2000$
$r_6 = 16.2959$
$\quad d_6 = 1.6000 \quad n_3 = 1.79952 \quad \nu_3 = 42.24$
$r_7 = -16.3073$
$\quad d_7 = 0.2000$
$r_8 = 7.1803$
$\quad d_8 = 2.0082 \quad n_4 = 1.57309 \quad \nu_4 = 42.57$
$r_9 = -10.5937$
$\quad d_9 = 3.1891 \quad n_5 = 1.80518 \quad \nu_5 = 25.43$
$r_{10} = 5.2586$
$\quad d_{10} = D_2$ (variable)
$r_{11} = 28.3967$
$\quad d_{11} = 1.9000 \quad n_6 = 1.56732 \quad \nu_6 = 42.83$
$r_{12} = -24.1392$
$\quad d_{12} = D_3$ (variable)
$r_{13} = \infty$
$\quad d_{13} = 0.6000 \quad n_7 = 1.51633 \quad \nu_7 = 64.15$
$r_{14} = \infty$

| f | W | S | T |
|---|---|---|---|
| $D_1$ | 9.430 | 5.226 | 1.000 |
| $D_2$ | 5.328 | 7.362 | 5.281 |
| $D_3$ | 5.478 | 7.648 | 13.985 |

$L/\sqrt{f_W \cdot f_T} = 2.6,$   $f_{II}/\sqrt{f_W \cdot f_T} = 0.82$ $|f_I|/\sqrt{f_W \cdot f_T} = 1.0,$   $f_{III}/\sqrt{f_W \cdot f_T} = 1.7$ $|D_W - D_S|/\sqrt{f_W \cdot f_S} = 0.17,$   $|f_{IIn}|/f_{II} = 0.35$ $(r_b + r_a)/(r_b - r_a) = -0.34$

Embodiment 3

$f = 10 \sim 20$ mm, $F/4.5 \sim F/6.4$
$2\omega = 46° \sim 24°$ $r_1 = 30.5293$
$\quad d_1 = 1.0000 \quad n_1 = 1.77250 \quad \nu_1 = 49.66$
$r_2 = 7.1938$
$\quad d_2 = 3.1218$
$r_3 = -23.2691$
$\quad d_3 = 1.0000 \quad n_2 = 1.69680 \quad \nu_2 = 55.52$
$r_4 = -50.9141$
$\quad d_4 = 0.2000$
$r_5 = 10.6858$
$\quad d_5 = 1.9000 \quad n_3 = 1.80518 \quad \nu_3 = 25.43$
$r_6 = 15.0281$
$\quad d_6 = D_1$ (variable)
$r_7 = 16.1064$
$\quad d_7 = 1.6000 \quad n_4 = 1.79952 \quad \nu_4 = 42.24$
$r_8 = -22.7496$ (pupil)
$\quad d_8 = 0.2000$
$r_9 = 7.1814$
$\quad d_9 = 2.0113 \quad n_5 = 1.57309 \quad \nu_5 = 42.57$
$r_{10} = -14.0151$
$\quad d_{10} = 3.2493 \quad n_6 = 1.80518 \quad \nu_6 = 25.43$
$r_{11} = 5.1904$
$\quad d_{11} = D_2$ (variable)
$r_{12} = 16.4793$
$\quad d_{12} = 1.9000 \quad n_7 = 1.49216 \quad \nu_7 = 57.50$
$r_{13} = -16.8958$
$\quad d_{13} = D_3$ (variable)
$r_{14} = \infty$
$\quad d_{14} = 0.6000 \quad n_8 = 1.51633 \quad \nu_8 = 64.15$
$r_{15} = \infty$

| f | W | S | T |
|---|---|---|---|
| $D_1$ | 10.406 | 5.318 | 1.000 |
| $D_2$ | 5.278 | 6.947 | 5.278 |
| $D_3$ | 7.831 | 11.250 | 17.267 |

$L/\sqrt{f_W \cdot f_T} = 2.9,$   $f_{II}/\sqrt{f_W \cdot f_T} = 0.98$ $|f_I|/\sqrt{f_W \cdot f_T} = 1.0,$   $f_{III}/\sqrt{f_W \cdot f_T} = 1.2$ $|D_W - D_S|/\sqrt{f_W \cdot f_S} = 0.14,$   $|f_{IIn}|/f_{II} = 0.32$ $(r_b + r_a)/(r_b - r_a) = -0.46$

Embodiment 4
$f = 10 \sim 17$ mm, F/4.4 $\sim$ F/7.4
$2\omega = 46° \sim 28°$

| | | | |
|---|---|---|---|
| $r_1 = 202.6193$ | | | |
| | $d_1 = 1.0000$ | $n_1 = 1.69680$ | $\nu_1 = 55.52$ |
| $r_2 = 9.4339$ | | | |
| | $d_2 = 8.1336$ | | |
| $r_3 = \infty$ (pupil) | | | |
| | $d_3 = D_1$ (variable) | | |
| $r_4 = 25.2296$ | | | |
| | $d_4 = 2.6000$ | $n_2 = 1.71700$ | $\nu_2 = 47.94$ |
| $r_5 = -16.0963$ | | | |
| | $d_5 = 0.2000$ | | |
| $r_6 = 9.1424$ | | | |
| | $d_6 = 4.5103$ | $n_3 = 1.56732$ | $\nu_3 = 42.83$ |
| $r_7 = -13.9626$ | | | |
| | $d_7 = 2.3442$ | $n_4 = 1.84666$ | $\nu_4 = 23.88$ |
| $r_8 = 8.7361$ | | | |
| | $d_8 = D_2$ (variable) | | |
| $r_9 = 57.3327$ | | | |
| | $d_9 = 1.9000$ | $n_5 = 1.51633$ | $\nu_5 = 64.15$ |
| $r_{10} = -26.3400$ (aspherical surface) | | | |
| | $d_{10} = D_3$ (variable) | | |
| $r_{11} = \infty$ | | | |
| | $d_{11} = 0.6000$ | $n_6 = 1.51633$ | $\nu_6 = 4.15$ |
| $r_{12} = \infty$ | | | | aspherical surface coefficient
$E = 0.26966 \times 10^{-3}$, $F = 0.73706 \times 10^{-5}$
$G = 0.86099 \times 10^{-7}$

| f | W | S | T |
|---|---|---|---|
| $D_1$ | 8.474 | 5.097 | 1.794 |
| $D_2$ | 1.410 | 3.573 | 3.154 |
| $D_3$ | 9.267 | 10.481 | 14.232 |

$L/\sqrt{f_W \cdot f_T} = 3.2$, $\quad f_{II}/\sqrt{f_W \cdot f_T} = 0.99$
$|f_I|/\sqrt{f_W \cdot f_T} = 1.1$, $\quad f_{III}/\sqrt{f_W \cdot f_T} = 2.7$
$|D_W - D_S|/\sqrt{f_W \cdot f_S} = 0.19$, $\quad |f_{IIn}|/f_{II} = 0.47$
$(r_b + r_a)/(r_b - r_a) = -0.23$

Embodiment 5
$f = 10 \sim 20$ mm, F/4.8 $\sim$ F/9.6
$2\omega = 46° \sim 24°$

| | | | |
|---|---|---|---|
| $r_1 = 58.2042$ | | | |
| | $d_1 = 1.0000$ | $n_1 = 1.77250$ | $\nu_1 = 49.66$ |
| $r_2 = 6.6201$ | | | |
| | $d_2 = 3.1178$ | | |
| $r_3 = 7.7987$ | | | |
| | $d_3 = 1.9000$ | $n_2 = 1.64769$ | $\nu_2 = 33.80$ |
| $r_4 = 10.9759$ | | | |
| | $d_4 = 1.7347$ | | |
| $r_5 = \infty$ (pupil) | | | |
| | $d_5 = D_1$ (variable) | | |
| $r_6 = 21.9653$ | | | |
| | $d_6 = 2.6000$ | $n_3 = 1.71700$ | $\nu_3 = 47.94$ |
| $r_7 = -17.6967$ | | | |
| | $d_7 = 0.2000$ | | |
| $r_8 = 8.1321$ | | | |
| | $d_8 = 4.5186$ | $n_4 = 1.56732$ | $\nu_4 = 42.83$ |
| $r_9 = -10.0748$ | | | |
| | $d_9 = 2.3355$ | $n_5 = 1.80518$ | $\nu_5 = 25.43$ |
| $r_{10} = 7.3687$ | | | |
| | $d_{10} = D_2$ (variable) | | |
| $r_{11} = 37.4844$ (aspherical surface) | | | |
| | $d_{11} = 1.9000$ | $n_6 = 1.60342$ | $\nu_6 = 38.01$ |
| $r_{12} = -29.8221$ | | | |
| | $d_{12} = D_3$ (variable) | | |
| $r_{13} = \infty$ | | | |
| | $d_{13} = 0.6000$ | $n_7 = 1.51633$ | $\nu_7 = 64.15$ |
| $r_{14} = \infty$ | | | | aspherical surface coefficient
$E = -0.26933 \times 10^{-3}$, $F = -0.41289 \times 10^{-5}$
$G = 0.48726 \times 10^{-6}$

| f | W | S | T |
|---|---|---|---|
| $D_1$ | 8.919 | 4.819 | 1.000 |
| $D_2$ | 1.440 | 3.349 | 1.522 |
| $D_3$ | 8.162 | 10.353 | 16.029 |

$L/\sqrt{f_W \cdot f_T} = 2.8$, $\quad f_{II}/\sqrt{f_W \cdot f_T} = 0.87$
$|f_I|/\sqrt{f_W \cdot f_T} = 1.0$, $\quad f_{III}/\sqrt{f_W \cdot f_T} = 2.0$
$|D_W - D_S|/\sqrt{f_W \cdot f_S} = 0.16$, $\quad |f_{IIn}|/f_{II} = 0.41$
$(r_b + r_a)/(r_b - r_a) = -0.16$

Embodiment 6
$f = 10 \sim 20$ mm, F/4 $\sim$ F/5.7
$2\omega = 46° \sim 24°$

| | | | |
|---|---|---|---|
| $r_1 = 75.7823$ | | | |
| | $d_1 = 1.0000$ | $n_1 = 1.77250$ | $\nu_1 = 49.66$ |
| $r_2 = 7.8134$ | | | |
| | $d_2 = 3.1161$ | | |
| $r_3 = 9.1395$ | | | |
| | $d_3 = 1.9000$ | $n_2 = 1.80518$ | $\nu_2 = 25.43$ |
| $r_4 = 11.7880$ | | | |
| | $d_4 = D_1$ (variable) | | |
| $r_5 = \infty$ (pupil) | | | |
| | $d_5 = 1.0000$ | | |
| $r_6 = 20.2183$ | | | |
| | $d_6 = 1.6000$ | $n_3 = 1.77250$ | $\nu_3 = 49.66$ |
| $r_7 = -23.4407$ | | | |
| | $d_7 = 0.2000$ | | |
| $r_8 = 9.0615$ | | | |
| | $d_8 = 2.0513$ | $n_4 = 1.77250$ | $\nu_4 = 49.66$ |
| $r_9 = 59.6821$ | | | |
| | $d_9 = 0.5000$ | | |
| $r_{10} = -52.6111$ | | | |
| | $d_{10} = 3.7641$ | $n_5 = 1.80518$ | $\nu_5 = 25.43$ |
| $r_{11} = 5.7398$ | | | |
| | $d_{11} = D_2$ (variable) | | |
| $r_{12} = 17.5525$ | | | |
| | $d_{12} = 2.3000$ | $n_6 = 1.51633$ | $\nu_6 = 64.15$ |
| $r_{13} = -16.7860$ | | | |
| | $d_{13} = D_3$ (variable) | | |
| $r_{14} = \infty$ | | | |
| | $d_{14} = 0.6000$ | $n_7 = 1.51633$ | $\nu_7 = 64.15$ |
| $r_{15} = \infty$ | | | |

| f | W | S | T |
|---|---|---|---|
| $D_1$ | 11.428 | 6.195 | 1.000 |
| $D_2$ | 3.177 | 5.993 | 5.757 |
| $D_3$ | 7.494 | 9.911 | 15.372 |

$L/\sqrt{f_W \cdot f_T} = 2.9$, $\quad f_{II}/\sqrt{f_W \cdot f_T} = 1.0$
$|f_I|/\sqrt{f_W \cdot f_T} = 1.2$, $\quad f_{III}/\sqrt{f_W \cdot f_T} = 1.2$
$|D_W - D_S|/\sqrt{f_W \cdot f_S} = 0.24$, $\quad |f_{IIn}|/f_{II} = 0.43$
$(r_b + r_a)/(r_b - r_a) = -0.80$

Embodiment 7
$f = 10 \sim 20$ mm, F/3.9 $\sim$ F/5.7.
$2\omega = 46° \sim 24°$

| | | | |
|---|---|---|---|
| $r_1 = 157.2254$ | | | |
| | $d_1 = 1.0000$ | $n_1 = 1.77250$ | $\nu_1 = 49.66$ |
| $r_2 = 7.0727$ | | | |
| | $d_2 = 3.1340$ | | |
| $r_3 = 9.3715$ | | | |
| | $d_3 = 1.9000$ | $n_2 = 1.80518$ | $\nu_2 = 25.43$ |
| $r_4 = 12.8371$ | | | |
| | $d_4 = D_1$ (variable) | | |
| $r_5 = = \infty$ (pupil) | | | |
| | $d_5 = 0.2000$ | | |
| $r_6 = 18.8495$ | | | |
| | $d_6 = 2.2000$ | $n_3 = 1.78800$ | $\nu_3 = 47.38$ |
| $r_7 = -16.8628$ | | | |
| | $d_7 = 0.2000$ | | |
| $r_8 = 7.4023$ | | | |
| | $d_8 = 2.9961$ | $n_4 = 1.57309$ | $\nu_4 = 42.57$ |
| $r_9 = -9.8516$ | | | |
| | $d_9 = 2.9657$ | $n_5 = 1.80518$ | $\nu_5 = 25.43$ |
| $r_{10} = 5.5407$ | | | |
| | $d_{10} = D_2$ (variable) | | |
| $r_{11} = 19.6049$ | | | |
| | $d_{11} = 2.2000$ | $n_6 = 1.56732$ | $\nu_6 = 42.83$ |
| $r_{12} = -26.3728$ | | | |
| | $d_{12} = D_3$ (variable) | | |
| $r_{13} = 69.5106$ | | | |

-continued

| | $d_{13}$ = 1.2000 | $n_7$ = 1.51633 | $v_7$ = 64.15 |
|---|---|---|---|
| $r_{14} = \infty$ | | | |
| f | W | S | T |
| $D_1$ | 9.287 | 4.960 | 1.000 |
| $D_2$ | 4.862 | 6.288 | 4.096 |
| $D_3$ | 5.231 | 8.133 | 14.315 |

$L/\sqrt{f_W \cdot f_T} = 2.8$, $\quad f_{II}/\sqrt{f_W \cdot f_T} = 0.82$ $|f_I|/\sqrt{f_W \cdot f_T} = 0.98$, $\quad f_{III}/\sqrt{f_W \cdot f_T} = 1.4$ $|D_W - D_S|/\sqrt{f_W \cdot f_S} = 0.12$, $\quad |f_{IIn}|/f_{II} = 0.35$ $(r_b + r_a)/(r_b - r_a) = -0.28$ wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, and the reference symbols $\nu_1, \nu_2, \ldots$ represent the Abbe's numbers of the respective lens elements. Further, the reference symbols W, S and T indicate the wide position, intermediate focal length and tele position respectively.

In each the Embodiments 1, 2, 3, 6 and 7, the aperture stop is moved together with the second lens unit along the optical axis for zooming the lens system.

In each of the Embodiments 4 and 5, the aperture stop is kept fixed together with the first lens unit for zooming the lens system.

When the zoom lens system according to the present invention is to be used only at the wide position and the tele position thereof, it is proper to select two focal lengths at which the airspace reserved between the second lens unit and the third lens unit remains unchanged from the wide position to the tele position as in the case of the Embodiment 3. In such a case, the zoom lens system according to the present invention comprises substantially one movable lens unit since focal length of the zoom lens system can be varied by moving the second lens unit and the third lens unit integrally.

In the Embodiment 7, a lens unit which is kept fixed for zooming and has a refractive power is arranged after the third lens unit. This lens unit serves mainly for controlling the exit pupil while maintaining favorable image quality.

Figure 1:
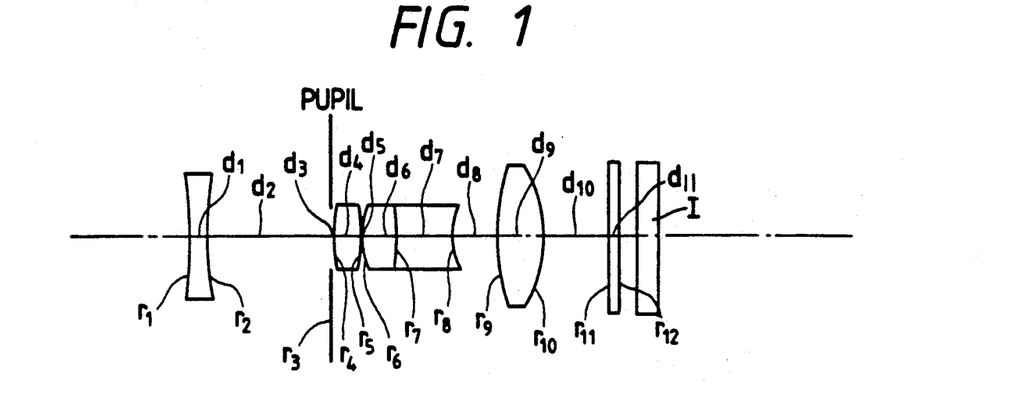
FIG. 1 through FIG. 7 show sectional views illustrating compositions of Embodiments 1 through 7 of the zoom lens system according to the present invention.
Figure 2:
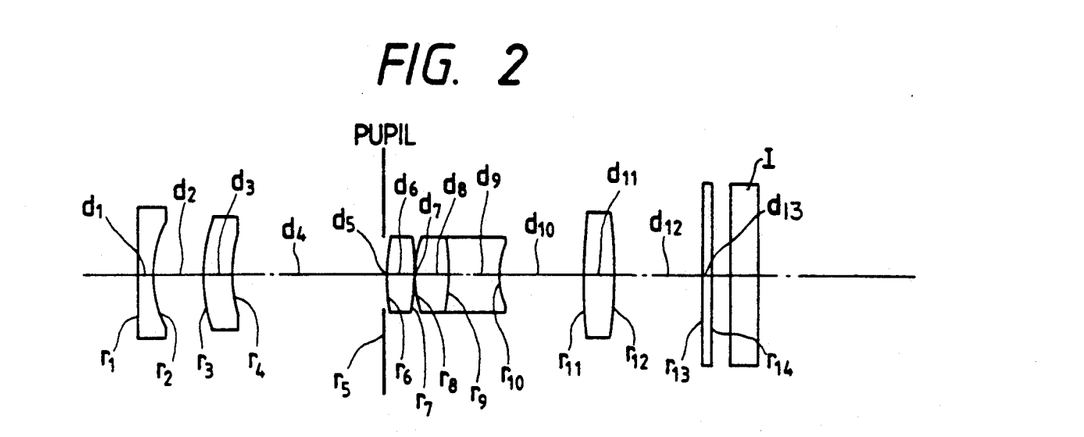
Figure 3:
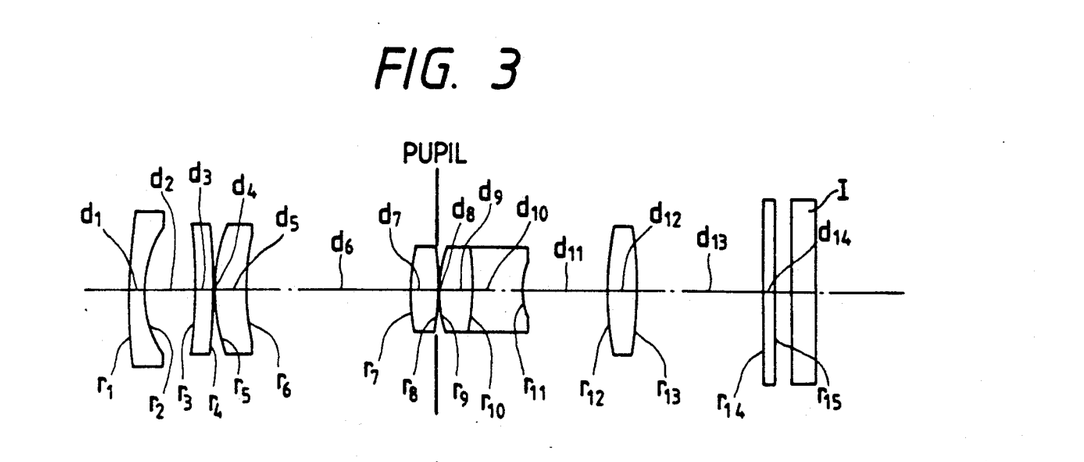
Figure 4:
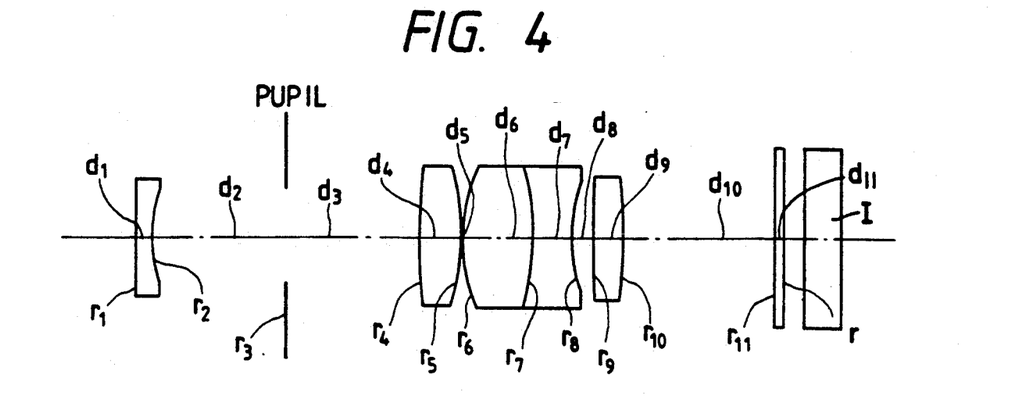
Figure 5:
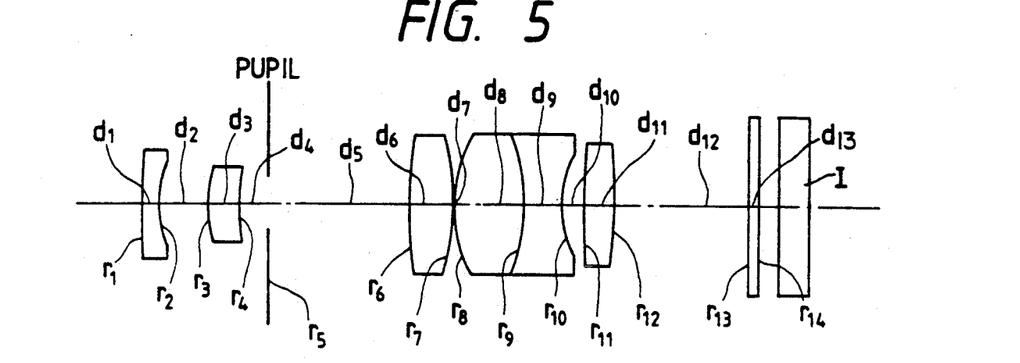
Figure 6:
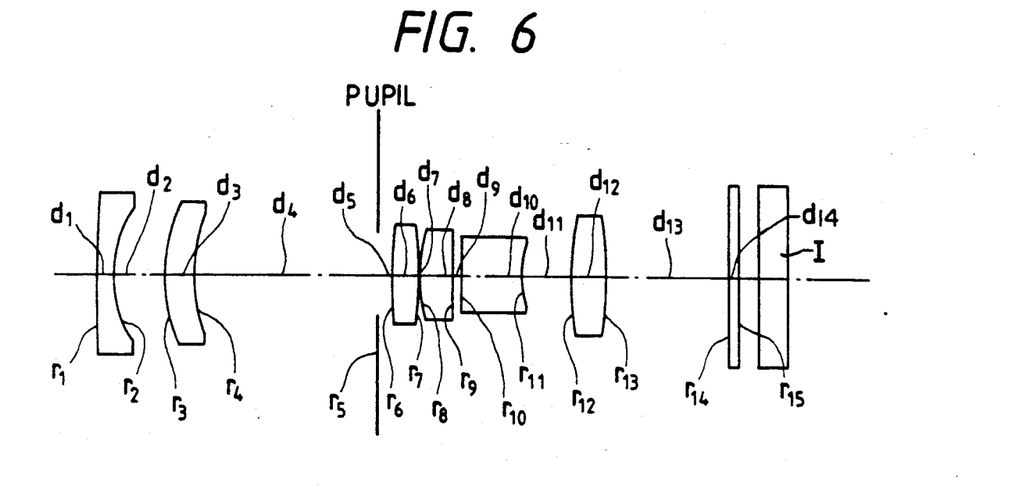
Figure 7:
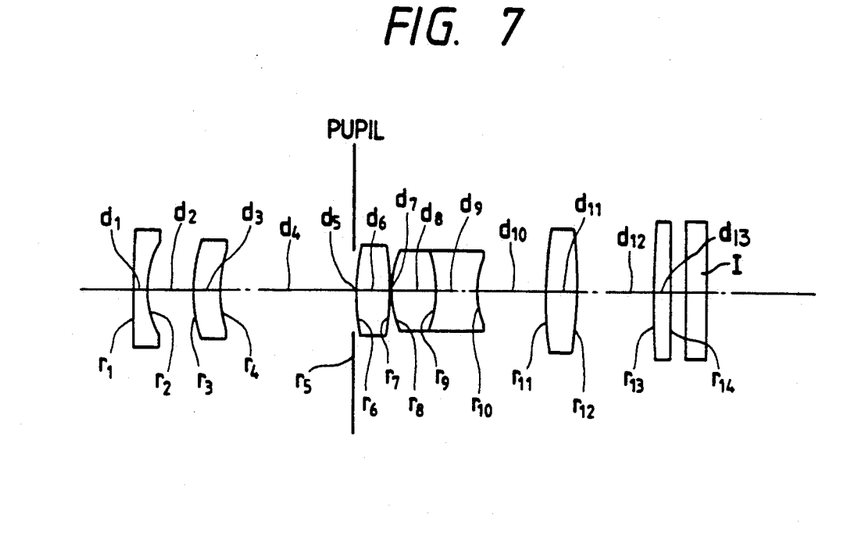
Figure 8:
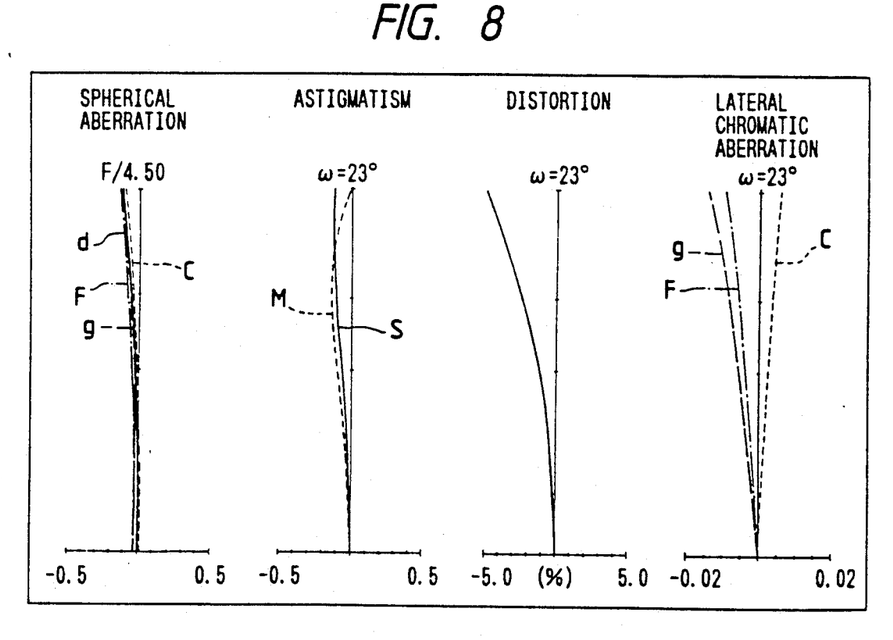
FIG. 8, FIG. 9 and FIG. 10 show curves illustrating aberration characteristics at the wide position, intermediate focal length and tele position respectively of the Embodiment 1 of the present invention.
Figure 9:
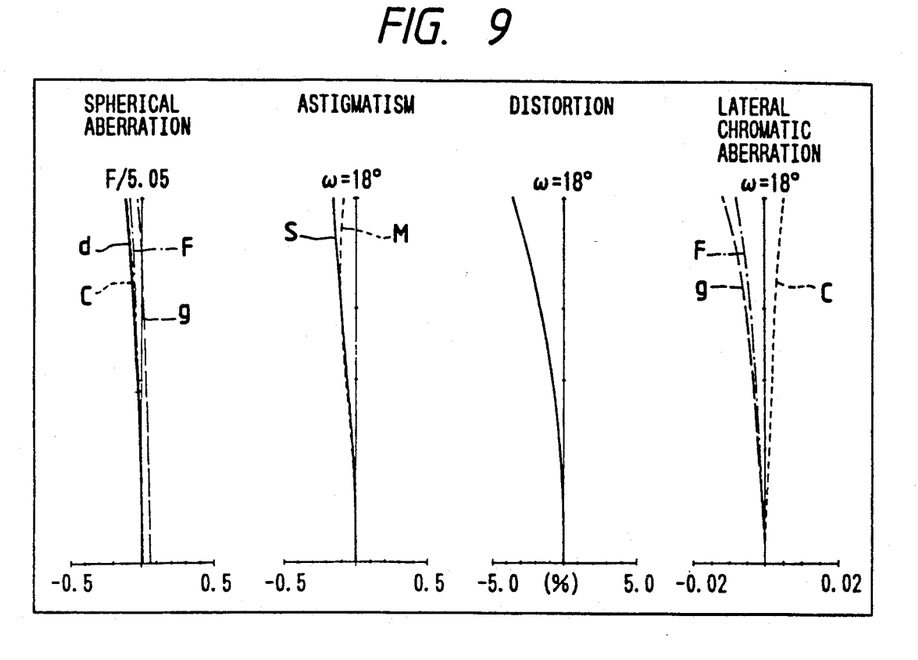
Figure 10:
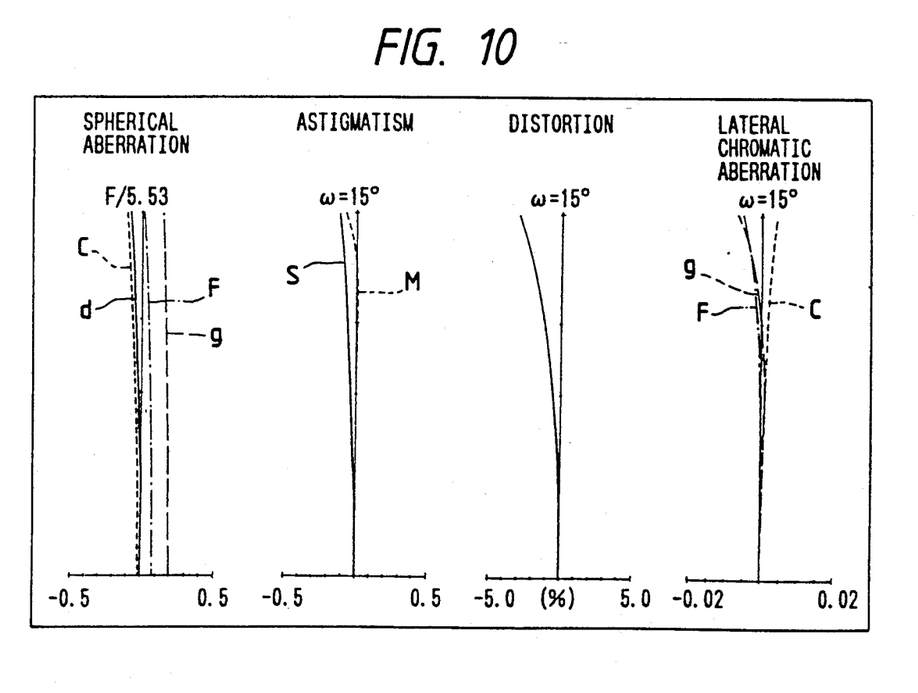
Figure 11:
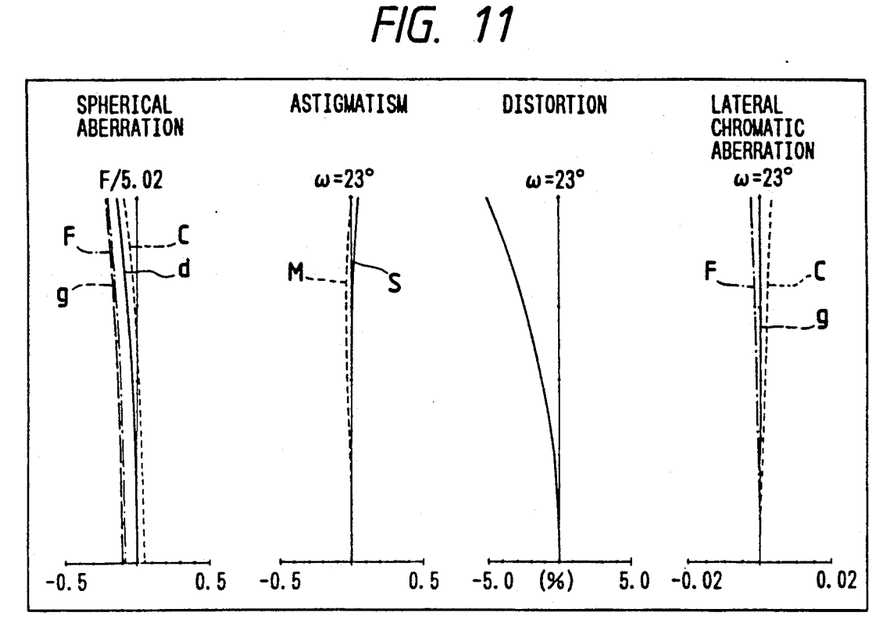
FIG. 11, FIG. 12 and FIG. 13 show curves illustrating aberration characteristics at the wide position, intermediate focal length and tele position respectively of the Embodiment 2 of the present invention.
Figure 12:
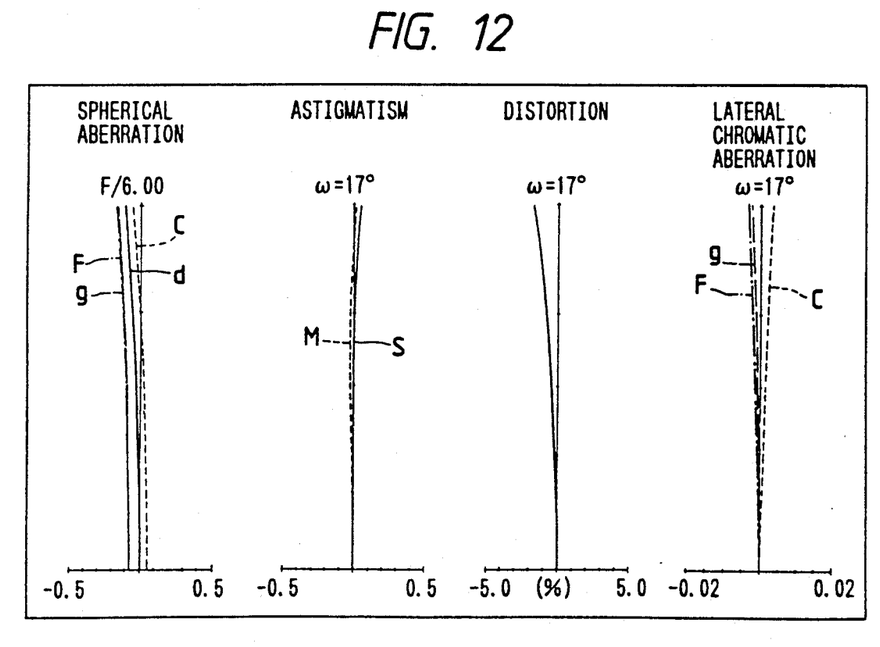
Figure 13:
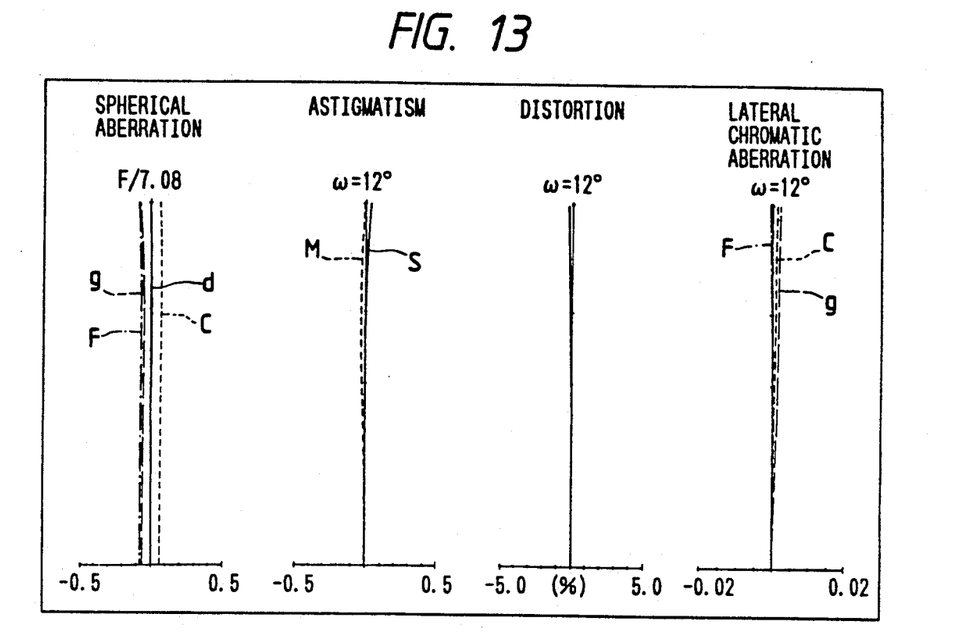
Figure 14:
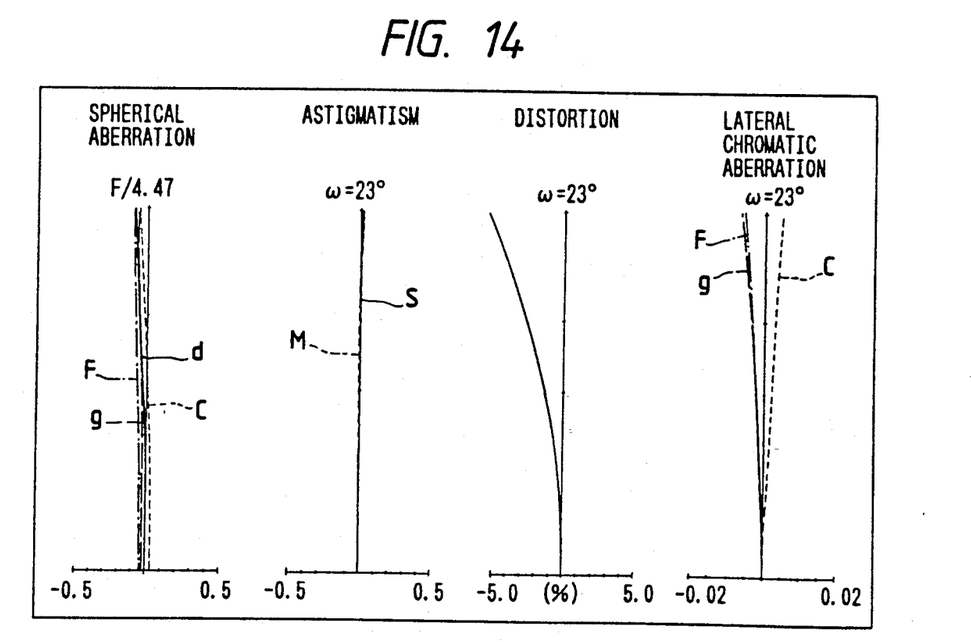
FIG. 14, FIG. 15 and FIG. 16 show graphs illustrating aberration characteristics at the wide position, intermediate focal length and tele position respectively of the Embodiment 3 of the present invention.
Figure 15:
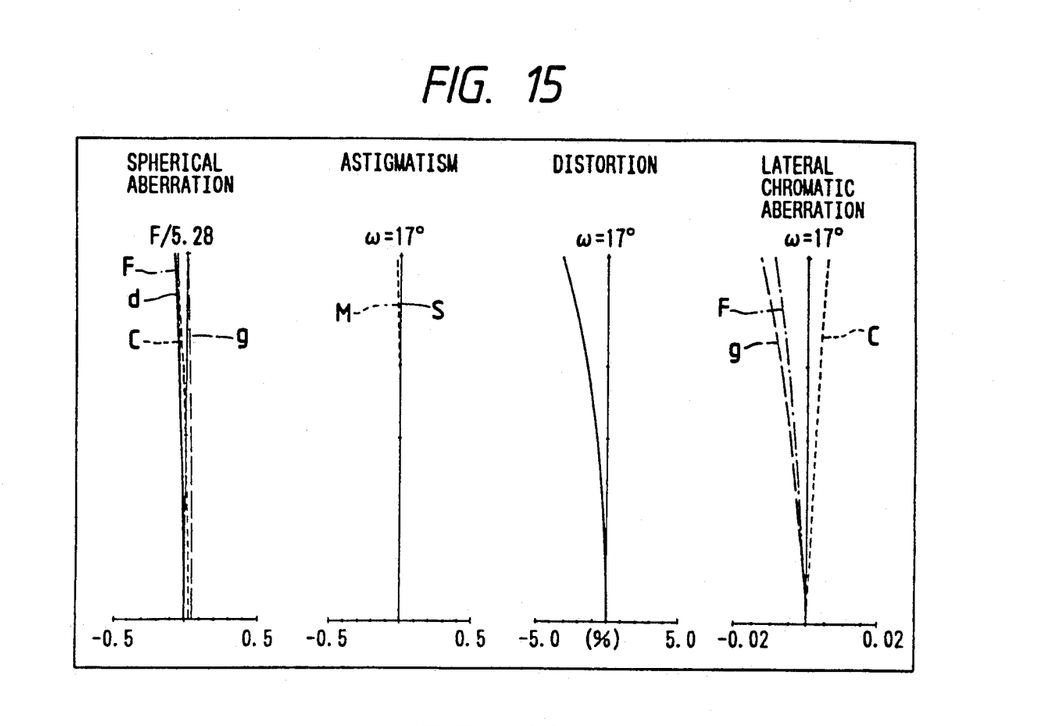
Figure 16:
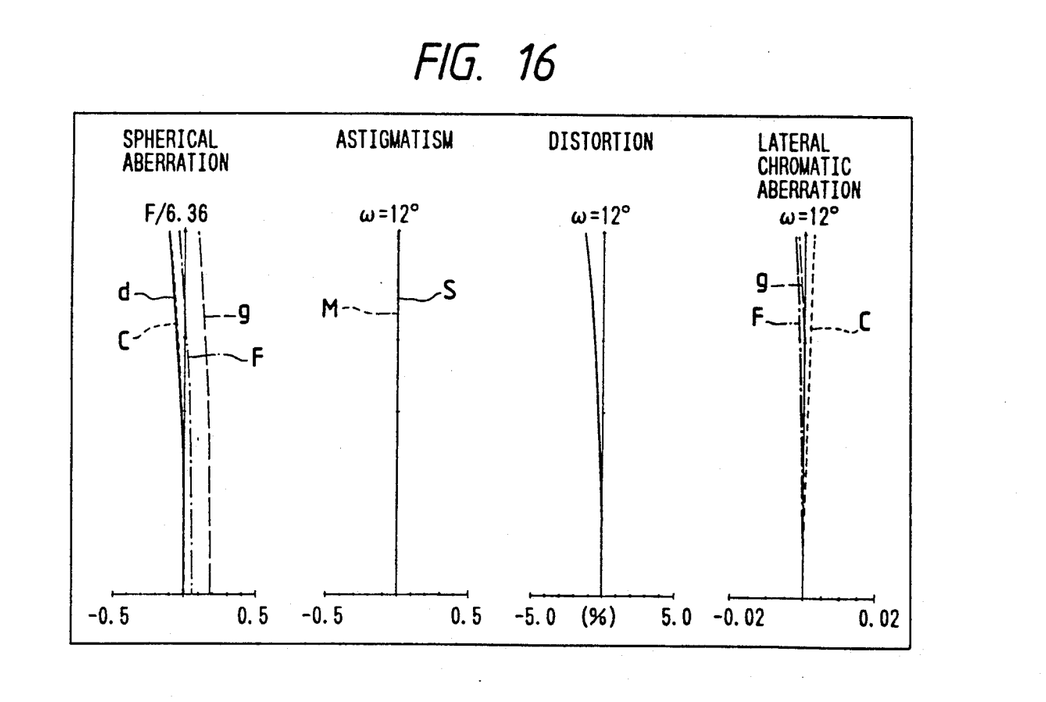
Figure 17:
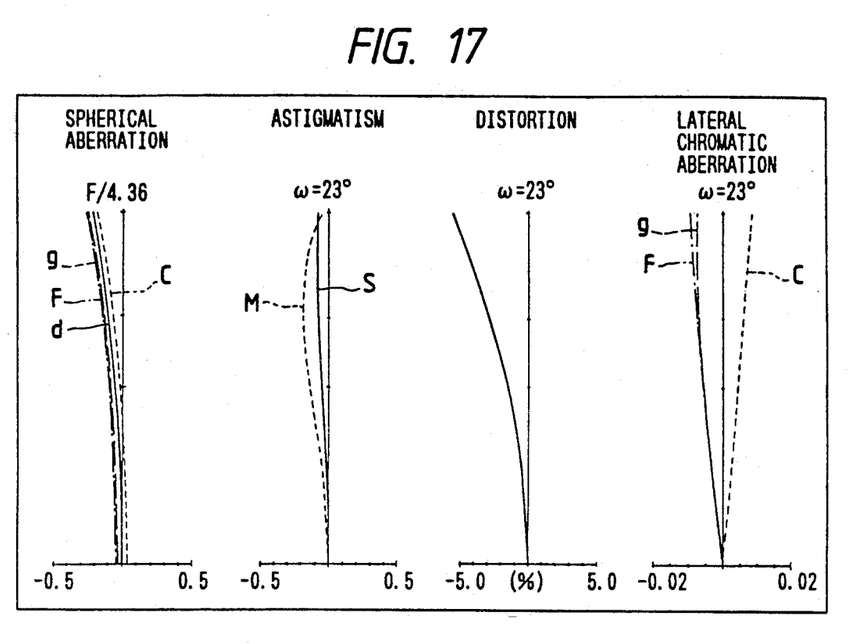
FIG. 17, FIG. 18 and FIG. 19 show graphs illustrating aberration characteristics at the wide position, intermediate focal length and tele position respectively of the Embodiment 4 of the present invention.
Figure 18:
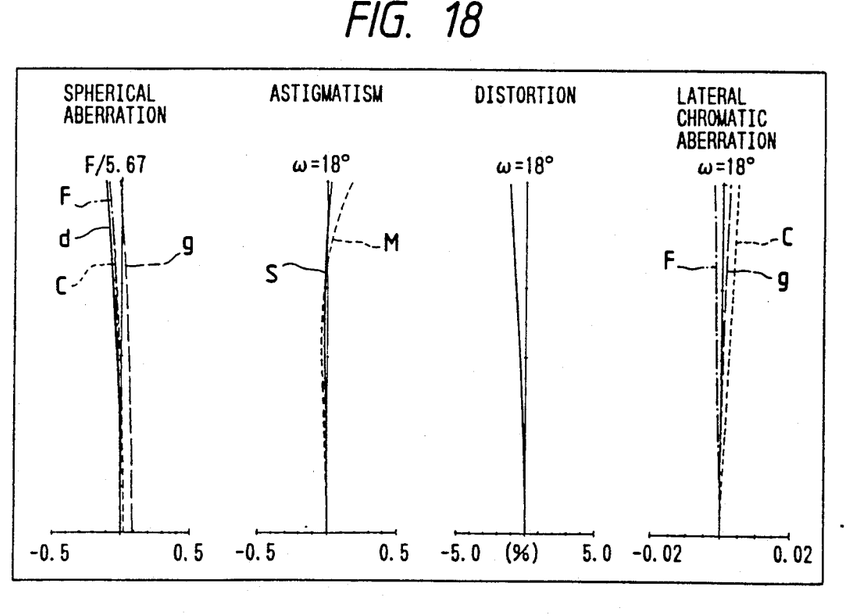
Figure 19:
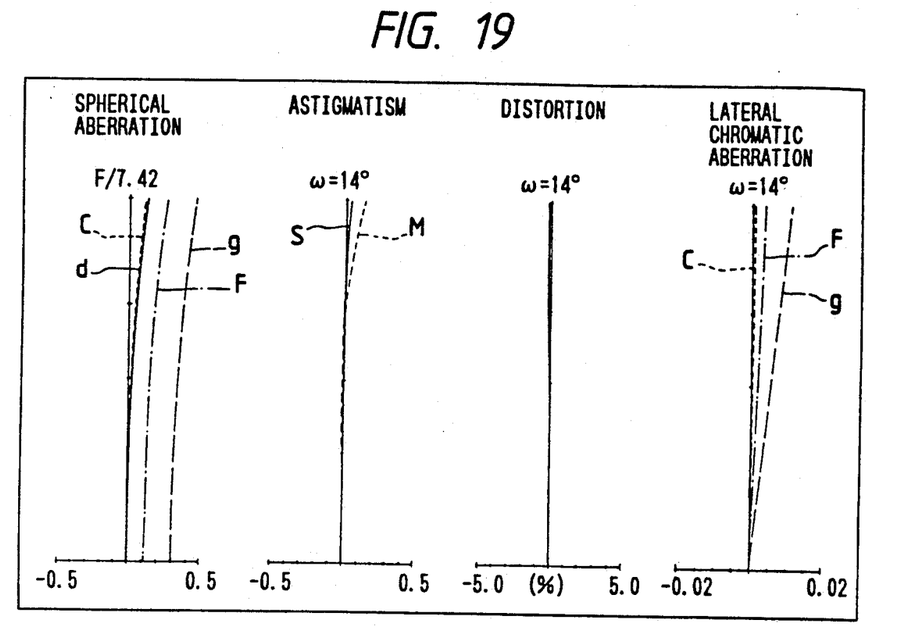
Figure 20:
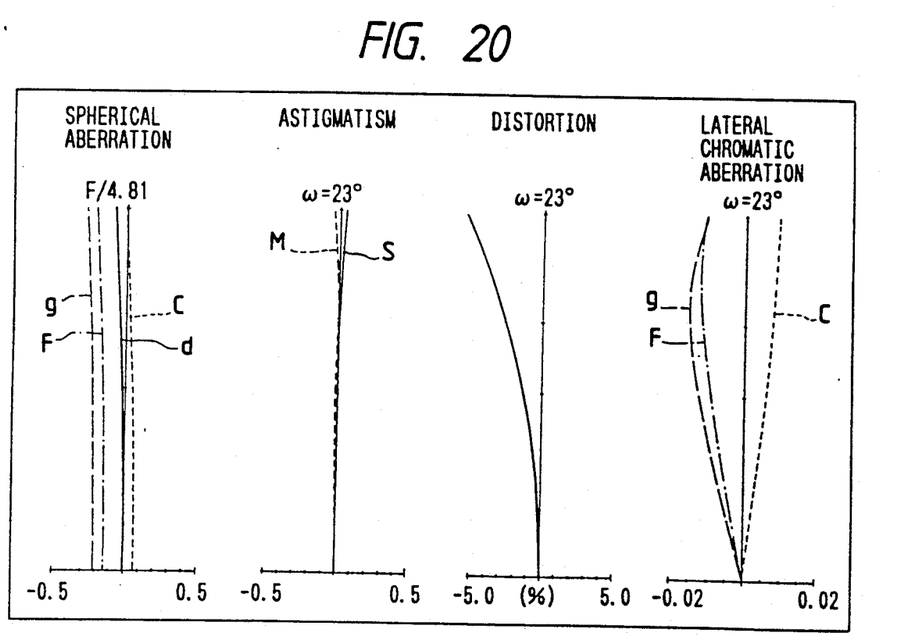
FIG. 20, FIG. 21 and FIG. 22 show curves visualizing aberration characteristics at the wide position, intermediate focal length and tele position respectively of the Embodiment 5 of the present invention.
Figure 21:
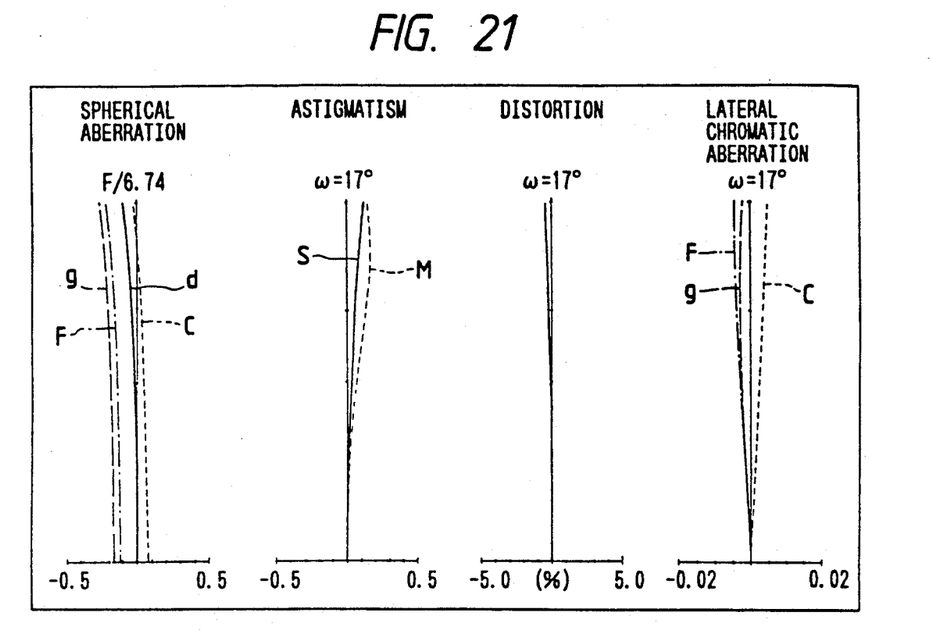
Figure 22:
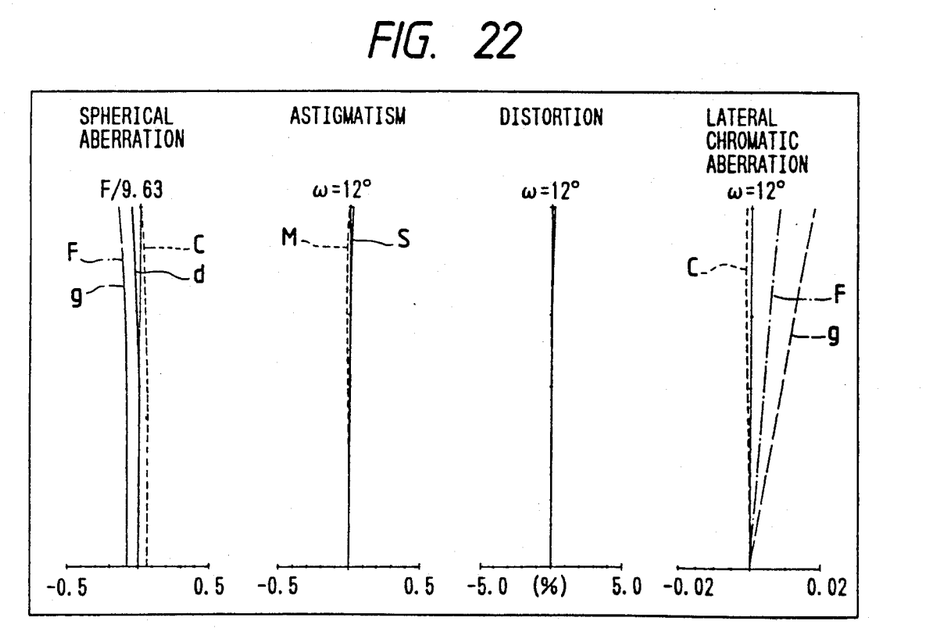
Figure 23:
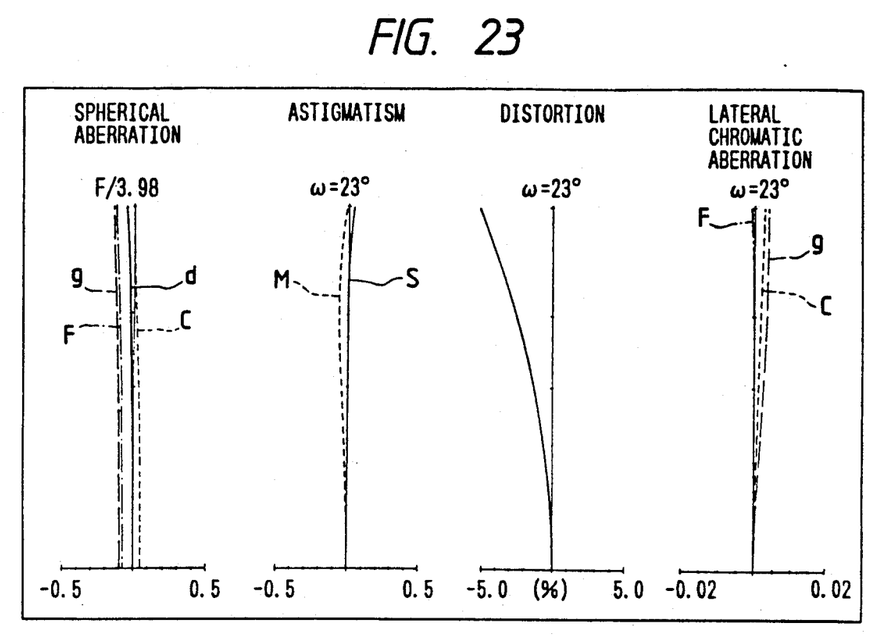
FIG. 23, FIG. 24 and FIG. 25 show curves visualizing aberration characteristics at the wide position, intermediate focal length and tele position respectively of the Embodiment 6 of the present invention.
Figure 24:
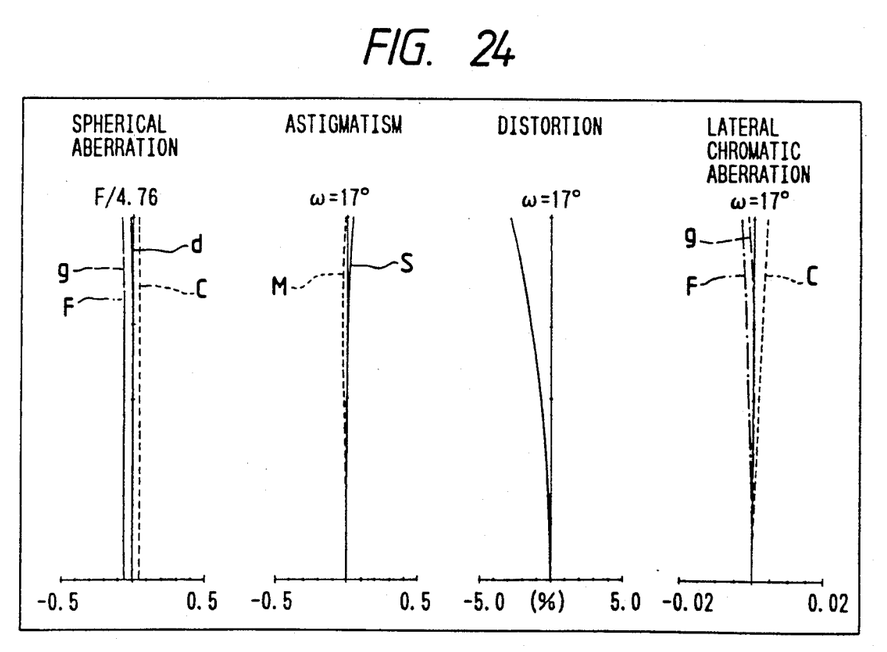
Figure 25:
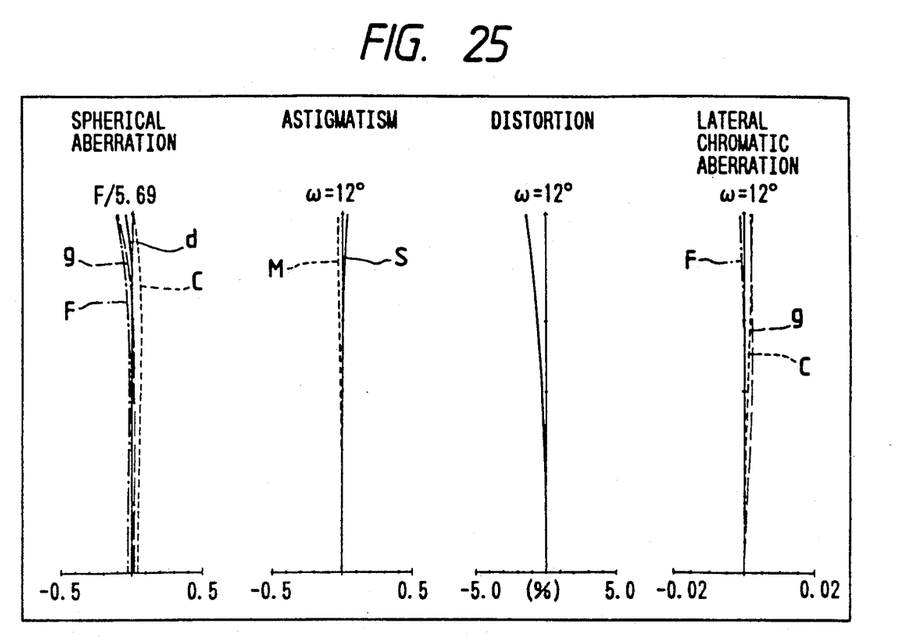
Figure 26:
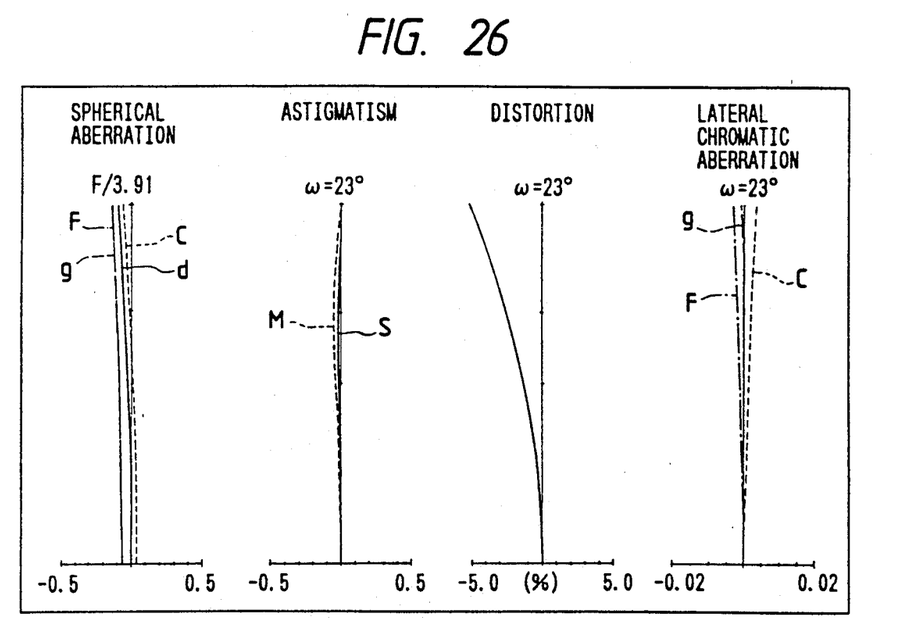
FIG. 26, FIG. 27 and FIG. 28 show graphs visualizing aberration characteristics at the wide position, intermediate focal length and tele position respectively of the Embodiment 7 of the present invention.
Figure 27:
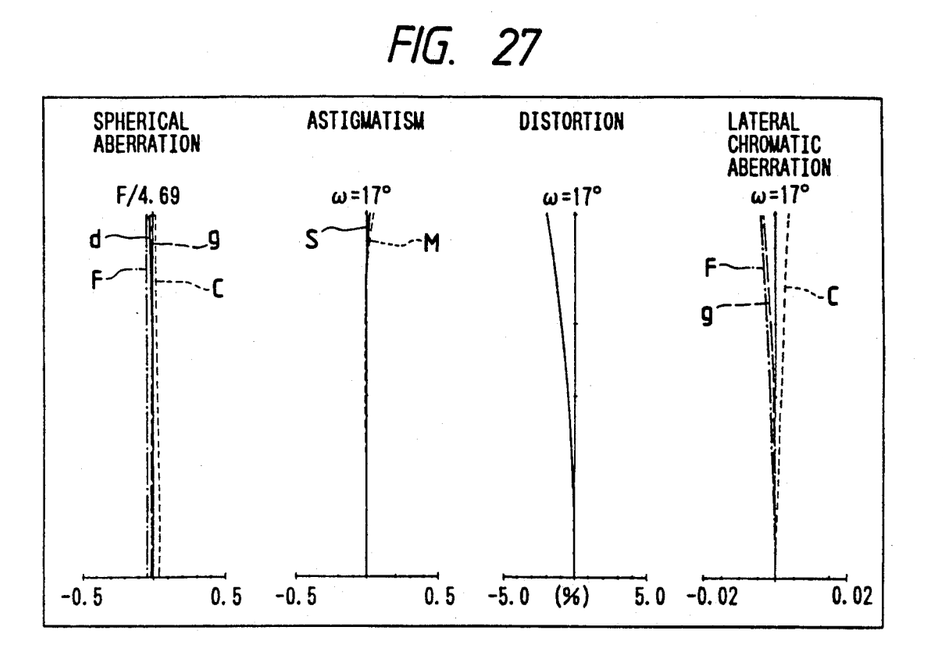
Figure 28:
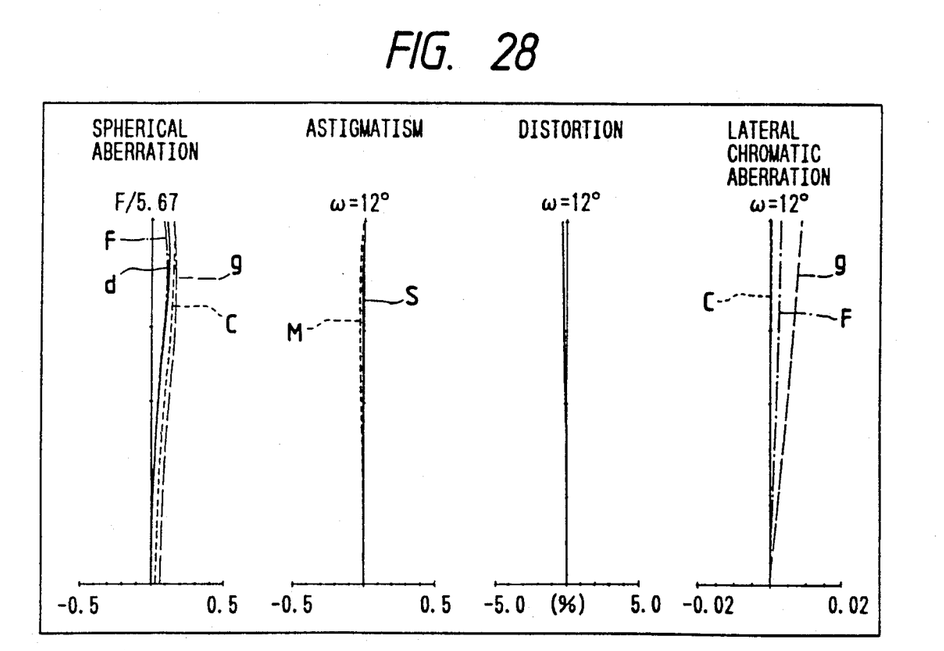

In each of the Embodiments 1 through 6, a plane parallel plate which has no refractive power is arranged after the third lens unit. This plane parallel plate is supposed to be a protective plate for an image pickup device. In the Embodiment 7, the front surface of this protective plate is designed as a slowly curved surface which has a refractive power just sufficient for allowing rays to be incident perpendicularly on an image pickup device. Thus, an image of an object is formed on an image receiving means, which is denoted by reference character I in FIGS. 1-7.

The Embodiments 4 and 5 use aspherical surfaces which have shapes expressed by the following formula when the direction of the optical axis is taken as the x axis and the direction perpendicular to the optical axis is taken as the y axis:

$$x = \frac{y^2}{r + r\sqrt{1 - (y/r)^2}} + Ey^4 + Fy^6 + Gy^8 + \ldots$$

wherein the reference symbol r represents the radius of the reference sphere of the aspherical surface of interest, and the reference symbols E, F, G, ... designate the aspherical surface coefficients.

I claim:

1. A photographic zoom lens system for forming an image of an object on an image receiving means, said zoom lens system comprising, in order from the object side:

a first lens unit having negative refractive power;
a second lens unit including a negative lens element and having a positive refractive power as whole;
a third lens unit having a positive refractive power;
wherein said zoom lens system varies focal length thereof moving the second lens unit and the third lens unit so as to vary an airspace reserved therebetween while the first lens unit is kept stationary; and
wherein said zoom lens system satisfies the following conditions (1), (2) and (3):

$$0.5 < f_{II}/\sqrt{f_W \cdot f_T} < 2.3 \quad (1)$$

$$0.6 < |f_I|/\sqrt{f_W \cdot f_T} < 1.5 \quad (2)$$

$$0.5 < f_{III}/\sqrt{f_W \cdot f_T} < 5 \quad (3)$$

wherein the reference symbol $f_I$ represents the focal length of said first lens unit, the reference symbol $f_{II}$ represents the focal length of the second, the reference symbol $f_{III}$ designates the focal length of said third lens unit, and the reference symbols $f_W$ and $F_T$ represent the focal lengths of the zoom lens system as a whole at the wide position and the tele position, respectively.

2. A photographic zoom lens system according to claim 1 comprising an aperture stop moved together with the second lens unit along the optical axis.

3. A photographic zoom lens system according to claim 1 comprising an aperture stop kept fixed on the optical axis.

4. A photographic zoom lens system for forming an image of an object on an image receiving means, said zoom lens system comprising in order from the object side:

a first lens unit having negative refractive power;
a second lens unit including a negative lens element and having a positive refractive power as whole; and
a third lens unit having a positive refractive power;
wherein said zoom lens system varies focal length thereof by moving the second lens unit and the third lens unit along an optical axis of the zoom lens system, while the first lens unit is kept fixed;
wherein an airspace between said second lens unit and said third lens unit is maintained constant between the wide position and the tele position; and
wherein said zoom lens system satisfies the following condition (1):

$$0.5 < f_{II}/\sqrt{f_W \cdot f_T} < 2.3 \quad (1)$$

wherein the reference symbol $f_{II}$ represents the focal length of the second lens unit, and the reference symbols $f_W$ and $f_T$ designate the focal lengths of the zoom lens system as a whole at the wide position and tele position, respectively.

5. A photographic lens system according to claim 4, satisfying the following conditions (2) and (3):

$$0.6 < |f_I|/\sqrt{f_W f_T} < 1.5 \quad (2)$$

$$0.5 < f_{III}/\sqrt{f_W f_T} < 5 \quad (3)$$

wherein the reference symbol $f_I$ represents a focal length of said first lens unit and the reference symbol $f_{III}$ designates a focal length of said third lens unit.

6. A photographic zoom lens system for forming an image of an object on an image receiving means comprising, in order from the object side:
- a first lens unit including a negative lens element;
- a second lens unit consisting of a positive lens element and a cemented doublet, the cemented doublet having a convex surface on the object side, said second lens unit having a positive refractive power; and
- a third lens unit consisting of a positive lens element;
- wherein said zoom lens system varies focal length by moving said second lens unit and said third lens unit along an optical axis of said zoom lens system while keeping said first lens unit fixed.

7. A photographic zoom lens system according to claim 6, wherein said first lens unit further comprises a positive meniscus lens element.

8. A photographic zoom lens system comprising in order from the object side:
- a first lens unit having negative refractive power;
- a second lens unit including a negative lens element and having a positive refractive power as whole;
- a third lens unit having a positive refractive power;
- wherein said zoom lens system varies focal length thereof by moving the second and third lens units so as to vary the airspace reserved therebetween while the first lens unit is kept stationary; and
- wherein said zoom lens system satisfies the following conditions (1), (2) and (3):

$$0.5 < f_{II}/\sqrt{f_W f_T} < 2.3 \quad (1)$$

$$0.6 < |f_I|/\sqrt{f_W f_T} < 1.5 \quad (2)$$

$$0.5 < f_{III}/\sqrt{f_W f_T} < 5 \quad (3)$$

wherein the reference symbol $f_I$ represents a focal length of said first lens unit, the reference symbol $f_{II}$ represents the focal length of the second lens unit, the reference symbol $f_{III}$ designates a focal length of said third lens unit, and the reference symbols $f_W$ and $f_T$ designate the focal lengths of the zoom lens system as a whole at the wide position and tele position, respectively.

9. A photographic zoom lens system according to claim 1, 5 or 8 wherein the airspace reserved between said second lens unit and said third lens unit satisfies the following condition (4):

$$0.01 < |D_W - D_S|/\sqrt{f_W \cdot f_S} < 0.8 \quad (4)$$

wherein the reference symbol $f_S$ represents the geometrical means of the focal lengths at the wide position and the tele position of the zoom lens system as a whole, and the reference symbols $D_W$ and $D_S$ designate the airspaces reserved between the second lens unit and the third lens unit at the focal lengths $f_W$ and $f_S$ respectively of the zoom lens system as a whole.

10. A photographic zoom lens system according to claim 9 wherein the negative lens element in the second lens unit satisfies the following condition (5):

$$0.2 < |f_{IIn}| < 0.8 \quad (5)$$

wherein the reference symbol $f_{IIn}$ represents the focal length of said negative lens element.

11. A photographic zoom lens system according to claim 10 wherein said negative lens element in said second lens unit satisfies the following condition (6):

$$-2 < (r_b + r_a)/(r_b - r_a) < 2 \quad (6)$$

wherein the reference symbol $r_a$ and $r_b$ represent the radii of curvature on the object side surface and the image side surface respectively of said negative lens element.

12. A photographic zoom lens system according to claim 11 wherein the second lens unit includes only the negative lens element that satisfies the following condition (7):

$$-1.5 < (r_b + r_a)/(r_b - r_a) < 0.5 \quad (7)$$

13. A photographic zoom lens system according to claim 1, 4, 6, 5 or 8, wherein said third lens unit includes an asperical surface.

* * * * *